(12) United States Patent
Nakari et al.

(10) Patent No.: US 11,325,808 B2
(45) Date of Patent: May 10, 2022

(54) TRANSPORT CONVEYOR DRIVE

(71) Applicant: KONE Corporation, Helsinki (FI)

(72) Inventors: Arto Nakari, Helsinki (FI); Olli Pokkinen, Helsinki (FI); Juhamatti Nikander, Helsinki (FI)

(73) Assignee: KONE Corporation, Helsinki (FI)

( * ) Notice: Subject to any disclaimer, the term of this patent is extended or adjusted under 35 U.S.C. 154(b) by 918 days.

(21) Appl. No.: 16/122,700

(22) Filed: Sep. 5, 2018

(65) Prior Publication Data
US 2019/0084793 A1    Mar. 21, 2019

(30) Foreign Application Priority Data

Sep. 19, 2017 (EP) .................................. 17191775

(51) Int. Cl.
| | | |
|---|---|---|
| *B66B 1/30* | (2006.01) | |
| *B66B 1/32* | (2006.01) | |
| *H02P 3/04* | (2006.01) | |
| *B66B 5/00* | (2006.01) | |
| *B66B 5/02* | (2006.01) | |
| *G05B 19/048* | (2006.01) | |

(52) U.S. Cl.
CPC ............... *B66B 1/306* (2013.01); *B66B 1/32* (2013.01); *B66B 5/0031* (2013.01); *B66B 5/028* (2013.01); *G05B 19/048* (2013.01); *H02P 3/04* (2013.01)

(58) Field of Classification Search
CPC ......... B66B 1/306; B66B 1/32; B66B 5/0031; B66B 5/028; B66B 1/30; B66B 5/02; B66B 11/04; B66B 23/02; B66B 25/003; B66B 29/00; G05B 19/048; H02P 3/04
See application file for complete search history.

(56) References Cited

U.S. PATENT DOCUMENTS

| | | | |
|---|---|---|---|
| 2015/0075917 A1 | 3/2015 | Kattainen et al. | |
| 2016/0254764 A1* | 9/2016 | Schmidt | .................... H02P 3/04 |
| | | | 318/362 |
| 2018/0327215 A1* | 11/2018 | Kattainen | ............. B66B 1/3423 |
| 2018/0334359 A1* | 11/2018 | Nikander | ................ B66B 5/044 |

FOREIGN PATENT DOCUMENTS

| | | |
|---|---|---|
| DE | 10 2005 027 502 A1 | 4/2006 |
| EP | 1 225 150 A1 | 7/2002 |
| EP | 2 942 866 A1 | 11/2015 |
| EP | 3 178 768 A1 | 6/2017 |

* cited by examiner

*Primary Examiner* — Jeffrey Donels
(74) *Attorney, Agent, or Firm* — Birch, Stewart, Kolasch & Birch, LLP (57) ABSTRACT

A transport conveyor drive having a rectifier and an inverter which are connected via a DC link, whereby the inverter comprises power switches for suppling electric power to an transport conveyor motor is disclosed. The transport convey drive comprises a motor controller for controlling the power switches of the inverter which is configured to produce control pulses in the control poles of the power switches, at least one safety signal interface, which is adapted to receive safety signals from a safety controller of the transport conveyor, and a brake control circuit having an output for supplying power to a brake coil of an electromagnetic brake, wherein at least one STO circuit is connected between the motor controller and each of the power switches of at least one half bridge of the inverter, the STO circuit being configured to transfer/cut the control pulses to the power switches.

20 Claims, 4 Drawing Sheets

TRANSPORT CONVEYOR DRIVE

The present invention relates to a transport conveyor drive as for example for an elevator, escalator, moving sidewalk or moving ramp. The inventive drive enhances safety aspects in the motor and brake drive of the transport conveyers. It is known to include safety components in the motor drive as well as in the brake drive of a transport conveyor which ensure a safe switch off of the conveyor motor and/or activation of the conveyor brake in case of any safety-related issues. A device of this type is e.g. known from EP 3 178 768 A1. Although a conveyor drive of this type ensures the safety of the system without the use of contactors or relays they are quite complicated.

It is therefore object of the present invention to provide a transport conveyor drive which enables a safe stop of the transport conveyor motor and/or activation of a transport conveyor brake in any case of safety problems, which drive should be easy to manufacture.

The object is solved with a transport conveyor drive according to claim 1 as well as with a transport conveyor according to claim 12. Preferred embodiments of the invention are subject-matter of the corresponding dependent claims. Advantageous embodiments of the invention are also described in the description and in the drawings of the present application.

Although the term "transport conveyor" comprises elevators, escalators, moving ramps as well as moving sidewalks, the invention is hereinafter explained by means of an elevator whereby all the statements made in this explanation also hold true for the other types of transport conveyors.

The motor drive has a frequency converter, i.e. a rectifier and an inverter which are connected via a DC link, whereby the inverter comprises power switches for supplying electric power to the elevator motor. This concept mirrors a modern frequency converter controlled motor drive. The motor drive further comprises a motor controller, for example a DSP (digital signal processor) controller, for controlling the power switches of the inverter, which motor controller is configured to produce control pulses in the control poles of the power switches, e.g. the gates.

The motor drive further has a safety signal interface, which is adapted to receive safety signals from a safety controller of the elevator which safety signals are used for controlling isolated power supplies for STO (safe torque off) circuits, which are safety circuits which transfer/cut the control pulses from the motor controller to at least some power switches of the inverter. The isolated power supply also provides the power supply for the brake controllers of the elevator brakes. Usually, elevators as well as escalators have two brakes for safety reasons.

The motor controller is referenced to a first bus bar in the DC link which is normally the negative bus bar of the DC link. By the term "referenced" it is meant that one of the terminals of the motor controller is connected to the first bus bar of the DC link, preferably the negative bus bar of the DC link. Furthermore, at least one STO circuit is connected between the motor controller and each of the power switches of at least one half bridge of the inverter. The STO circuit is referenced also to the first bus bar of the DC link, preferably the negative bus bar. Furthermore, as mentioned above, the motor drive has a (galvanically) isolated power supply for the STO circuit which power supply is connected between the safety signal interface and the STO circuit, such that an input terminal of the power supply is referenced to ground whereas an output terminal of the isolated power supply is referenced to the same bus bar of the DC link as the motor controller, which means preferably the negative bus bar of the DC link. This galvanically isolated power supply forms the power supply for each STO circuit to transfer or cut the control pulses of the motor controller dependent on the status of the safety signal received in the safety signal interface. That means that according to the status of the safety signals of the elevator's safety controller, the galvanically isolated power supply is switched on or off and thus also the motor is allowed to run—according to the control pulses of the motor controller—or it is stopped, if these control pulses are cut by the STO circuit. Generally, the isolated power supply is switched on if the safety status of the elevator is on, i.e. no safety related events existing. On the other hand, the isolated power supply is immediately switched off in case any safety issues arise in the elevator which are communicated via the safety controller to the safety interface, e.g. by an off-state of a safety signal. This always leads to an elevator stop if the power goes down.

The STO circuit is configured to transfer or cut the control pulses to the power switches dependent on the power received from the isolated power supply. This means that if the isolated power supply is switched off dependent on the safety signals and the safety interface, also the STO circuit is switched off and thus no control signals can be passed to the power switches of the inverter which immediately stops the motor. Thus, by the fact that the isolated power supply is controlled via at least one safety signal received via the safety signal interface, the switching off of the motor controller is always ensured. This allows the frequency converter, i.e. the rectifier being connected to AC mains without any contactors or relay mounted in between to separate the frequency converter from mains in case of any accidents. These contactors or relays are prone to wear and thus need regular maintenance. With the inventive drive, the same safety standard can be obtained without the use of any contactors or relays between mains and the frequency converter. On the other hand, due to the fact that the STO circuit and the output of the galvanically isolated power supply is referenced to a bus bar of the DC link, the whole safety electronics can be designed less complicated.

Because main electronics as motor controller, as well as safety circuit as STO circuit and brake controller are referenced to a first bus bar of the DC link, also most of the signalization, such as most of measurement signals and control signals are referenced to the bus bar of the DC link. Therefore no such circulating currents as in traditional solutions are generated between DC link and ground which could cause disturbances such as common-mode noise. These signals may include, for example, DC link voltage measurement signals, DC link current measurement signals as well as control signals of power switches of the low-side half bridge of inverter and rectifier. Thus, for the STO circuit, simple low cost isolated topology power supply of the isolated power supply can be used. This benefits in a better circuit board layout and in a better signal quality in power supply transmission.

Additionally or alternatively, the brake control circuit comprises a transformer with a primary and a secondary side, whereby the transformer primary side being referenced to the first bus bar of the DC link, preferably to the negative bus bar, and the secondary side is configured to be connected to a brake coil of the elevator. In the primary side of the transformer, a modulating semiconductor switch is located which is connected to a brake controller which brake controller is configured to generate control pulses for said modulating semiconductor switch whereby the brake controller is referenced also to the first bus bar of the DC link, which is regularly the negative bus bar.

Finally, an isolated power supply is connected between the safety interface and the brake controller to supply or cut power to the brake controller, whereby the output of the isolated power supply is referenced to the same bus bar of the DC link as the brake controller which is preferably the negative bus bar. In case the brake controller further gets signals from the motor controller, this control input does not have to be galvanically isolated as both motor control (DSP) and brake controller (PWM) generator are referenced to the negative DC link bus bar.

According to this topology, the brake controller obtains its power from the isolated power supply. In case of any safety-related issues, the safety controller of the elevator issues a corresponding safety signal to the safety interface whereupon the isolated power supply shuts down and the brake controller stops controlling the modulating semiconductor switch which immediately leads to a closing of the brake. Thus, the safety-related shutdown of the isolated power supply also stops the brake controller to control the brakes to be open. In this case, by referencing the switching electronics for the brake to the negative bus bar of the DC link, the topology of the brake control circuit and modulating semiconductor switch can be held easy. The modulating semiconductor switch preferably is driven with a high frequency of at least 1 kHz, preferably more than 20 kHz particularly more than 50 kHz, but preferably less than 500 kHz more particularly less than 300 kHz, and most preferred less than 150 kHz. Therefore, the transformer can be kept small and is accordingly easy cheap to manufacture.

Also in case of the brake controller, the control of the brake occurs via the galvanically isolated power supply which is controlled via at least one safety signal of the safety interface from the safety controller of the elevator thus ensuring a safe brake operation in any case of safety-related items. This galvanically isolated power supply feeds power only to the brake controller, which is regularly a small IC chip, and not to the brake coil via the brake control circuit). Also in this solution no contactors or relays have to be provided to separate the brake controller from AC mains.

The inventive motor controller and/or brake controller can be provided alternatively or additionally so as to provide an advantageous general concept of motor control as well as brake control.

As it has mentioned before, preferably the first bus bar is the negative DC link bus bar, in which case the electronic components are easy to design and allow a less complicated layout for the safety-related components like STO circuits, transformer and modulating semiconductor switch.

Preferably, the STO circuit comprises a first and a second STO circuit which are connected in series between the motor controller and the power switch. Via the series connection of two STO circuits, a redundant safety is obtained so that even in case of fail-operation of one STO circuit, the other STO circuit still cuts the control pulses from the motor controller to the power switch, which increases the overall safety level.

Preferably, the first STO circuit, which is connected to the motor controller, comprises a galvanic isolation of the input signal of the motor controller so that any fail output signal of the motor controller, as e.g. a short-circuit does not harm the STO circuit. Also in this case both inputs and outputs of the STO circuit are however referenced to the same first bus bar, preferably the negative DC link bus bar.

Preferably, the at least one STO circuit comprises a preferably galvanically isolated feedback circuit to signalize the status of the STO circuit to a safety controller of the elevator. Via this measure, the safety controller of the elevator always comprises information about the operating status of the STO circuits. This further enhances the safety standard of the drive.

In a preferred embodiment of the invention, the modulating semiconductor switch is a SiC MOSFET transistor which is designed to switch the comparably high load of the brake coil with the corresponding frequency. Alternately, a cascade of semiconductor switches could be used. The switching frequency of the modulating semiconductor switch is preferably between 70 kHz and 150 kHz.

In a preferred embodiment of the invention, the galvanically isolated power supply, which is a very small power supply, that feeds power from safety signal via safety interface only to the small IC chips, such as motor controller and brake controller, but not to the power consuming components as e.g. the brake coil, comprises a transformer with a primary and a secondary side whereby the primary side is referenced to ground and the secondary side is referenced to the first bus bar of the DC link. With this embodiment, the primary side which is connected to the safety interface could comprise a signal processing circuit designed to provide a continuous AC or pulsed signal with a certain minimum frequency of at least 1 kHz, preferably more than 20 kHz particularly more than 50 kHz, but preferably less than 500 kHz more particularly less than 300 kHz, and most preferred less than 150 kHz. The signal processing circuit might preferably be a PWM controller with high side and low side MOSFET transistors of an integrated synchronous buck regulator (or converter). The secondary side is connected to the STO or brake controller. By this means a galvanic isolation is obtained via the transformer and on the other hand a DC supply voltage can be obtained on the secondary side by providing a smoothing circuit, e.g. a capacitor. This allows an easy circuit topology of the isolated power supply.

In a preferred embodiment of the invention, the transformer comprises several secondary sides whereby each of the secondary sides is provided for STO circuits or brake controllers. Via this measure, it could be ensured that separated signal paths on the secondary side are providing for each STO circuit and each brake controller, ensuring redundancy which improves the general safety level of the drive.

Advantageously, two transformers could be provided in at least one or several isolated power supplies, whereby the primary side of the each transformer is connected via a corresponding support circuit with a safety signal of the safety interface and whereby the secondary sides are linked for example to a first STO circuit whereas the other transformer is connected to a second STO circuit, for each power switch of the inverter. In this case two STOs are connected in series to improve the safety of the system.

In the same way, one transformer of the isolated power supply or a separate isolated power supply may be connected to one of the brake controllers respectively. Via this measure, redundancy is provided starting from the safety interface.

Preferably, two isolated power supplies are provided, in which case the first power supply supplies all STO circuits and a first brake controller and the second isolated power supply supplies energy to the second brake controller. Via this measure a two-stage braking process can be enabled with initially braking only with one brake to reduce excess deceleration which could harm passengers. The second safety signal is turned to off-state only with a delay so that the second brake is activated after the car has slowed down so that excess deceleration is avoided when activating the second brake. The second brake could also be activated only after the car has stopped or if a required deceleration is not obtained.

In a preferred embodiment of the invention, the brake control circuit has an isolated flyback topology which is a very simple circuit to provide an isolated signal processing. This galvanic isolation provides on one hand an easy way to achieve a safety circuit operating principle by cutting the pulses required to transfer energy from the primary part to secondary part of the transformer of the flyback converter to energize the brake coil of the elevator brake. On the other hand, this isolation provides a step-down function from the high voltage DC link (because power to the brake coil is fed from DC link of the drive) which regularly works with voltages of 500 to 700 V to a lower brake voltage which usually is between 100 and 200 V. The converter of the flyback circuit supplies the brake from the DC link voltage enabling use of regenerative power efficiently with the lowest amount of interim power conversions and emitting only a low amount of harmonics.

By use of the inventive brake controller energy supply with the isolated power supply, electromechanical components as contactors to separate the brake controller from mains are avoided.

In a preferred embodiment of the invention, the STO circuits are connected only between the motor controller and the power switches of the upper half bridge of the inverter. This allows dynamic braking with the power switches of the lower half bridge of the inverter and on the other hand safely shuts the inverter off in any case of safety-related issues.

The invention also refers to a transport conveyor, particularly an elevator, escalator, moving sidewalk or moving ramp, having at least one transport conveyor and a transport conveyor drive as mentioned above.

In case the transport conveyor is an elevator, it has preferably at least one elevator car and preferably a counterweight whereby the counterweight and the elevator car are suspended on hoisting ropes which are driven by a traction sheave which traction sheave is driven by the elevator motor. The elevator further comprises preferably an elevator control with a safety controller which issues the safety signals for the safety interface of the above-mentioned elevator drive. The safety controller may issue two safety signals to the safety interface whereby a second safety signal is delayed with its status with respect to a first safety signal at least in some operational situations. This allows two-stage braking with initial activation of only one elevator brake and activation of the second brake after slow-down or stop of the elevator car, or if a malfunction of the one brake is determined.

Preferably, the transport conveyor has a safety controller with a multitude of safety switches, e.g. the safety contacts of a safety chain, whereby the outputs of the safety controller and/or of other safety-related components of the transport conveyor are connected to the one safety interface. Via this measure, the brake controller as well as the STOs are controlled via all safety-relevant signals from the transport conveyor.

Preferably, the safety signal interface is connected with an isolated power supply comprising a signal processing circuit for processing the safety signal, a transformer with at least on primary side connected to the signal processing circuit and a secondary side having a smoothing circuit, which secondary side is connected to the STO circuits and brake controllers to form their power supply.

Preferably, the transport conveyor has a safety controller with an input for the output signals of feedback circuits of the STO circuits, which allows monitoring status of the STO circuits or of the inverter. Thus, each STO circuit preferably comprises such a feedback circuit which is preferably galvanically isolated to provide feedback information for the safety controller of the transport conveyor. Of course, the feedback circuit should comprise a galvanically isolating circuit as the safety controller is referenced to ground while the STO circuit is referenced to DC− of the DC link.

It should be clear for the skilled person that the above-mentioned embodiments can be combined with each other arbitrarily.

Following expressions are used as synonyms: transport conveyor—elevator—escalator—moving sidewalk—moving ramp; DSP—digital signal processor; STO—safe torque off—safety circuit; first bus bar—negative bus bar of the DC link—DC−.

The invention is now described by means of an example in connection with the enclosed drawing. In this drawing.

In all figures the same reference numbers refer to identical or functionally identical components.

Figure 1:
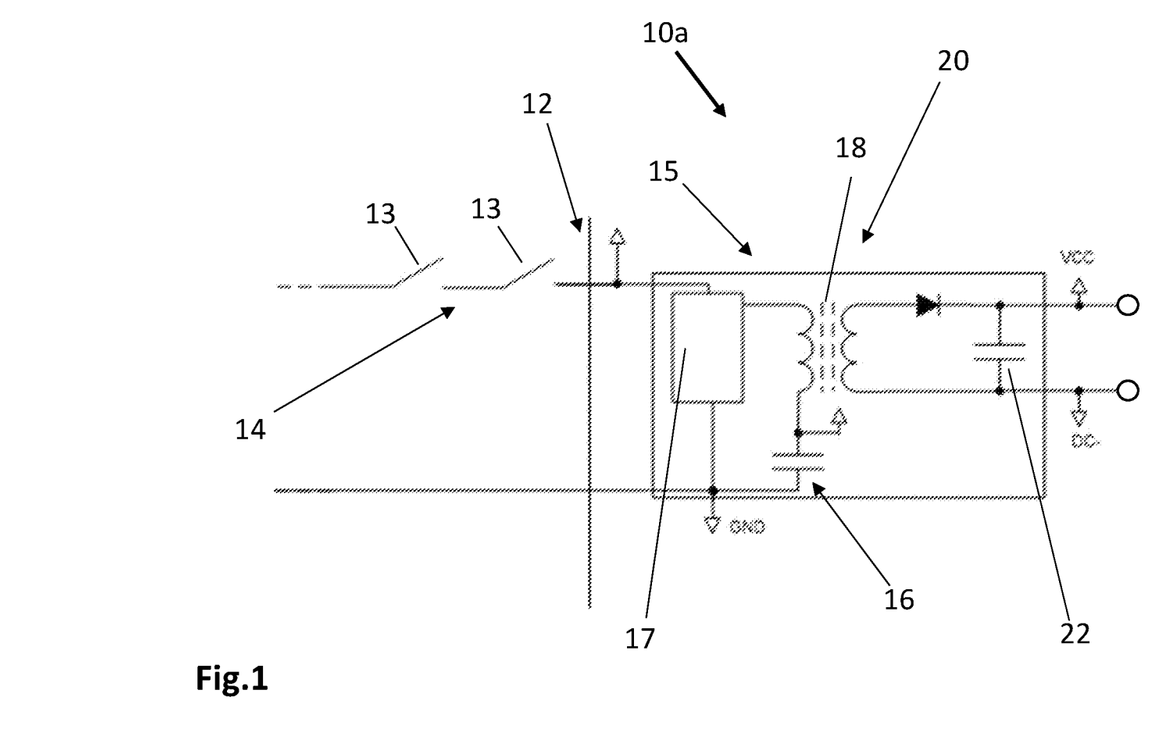
FIG. 1 shows a circuit diagram of an isolated power supply of an inventive brake drive.

FIG. 1 shows an isolated power supply 15 as a first brake drive part 10*a* comprising a safety interface 12 receiving output signals of a safety circuit 14 of a transport conveyor having several safety switches 13, such as safety relays or safety contacts of a safety chain. Preferably, the safety circuit 14 comprises a safety controller which reads status of safety contacts of safety chain. Based on said status, the safety controller generates or interrupts the safety signals by closing the safety relays (connecting the safety signal) or opening the safety relays (interrupting the safety signal). The safety interface 12 is connected to the input of a first isolated power supply 15 which forms a kind of safety circuit of the brake drive 10 and comprises a primary circuit 16, a transformer 18 and a secondary circuit 20. The primary circuit 16 comprises a signal processor 17 receiving the signals from the safety interface 12 and dependent on an on/off-status of the safety signals forwards a support voltage of a certain frequency, preferably 100 Hz or more, most preferably 1 kHz or more, even up to 500 kHz, to the transformer 18 of the isolated power supply 15. The secondary circuit 20 of the first isolated power supply 15 is connected to the secondary side of the transformer 18 and comprises a capacitor 22 to provide a direct current support voltage VCC for the brake controllers 24*a*, 24*b* of the brake control circuit 26 as shown in FIG. 2, whereby the support voltage is linked to the negative bus bar DC− of the DC link.

Figure 2:
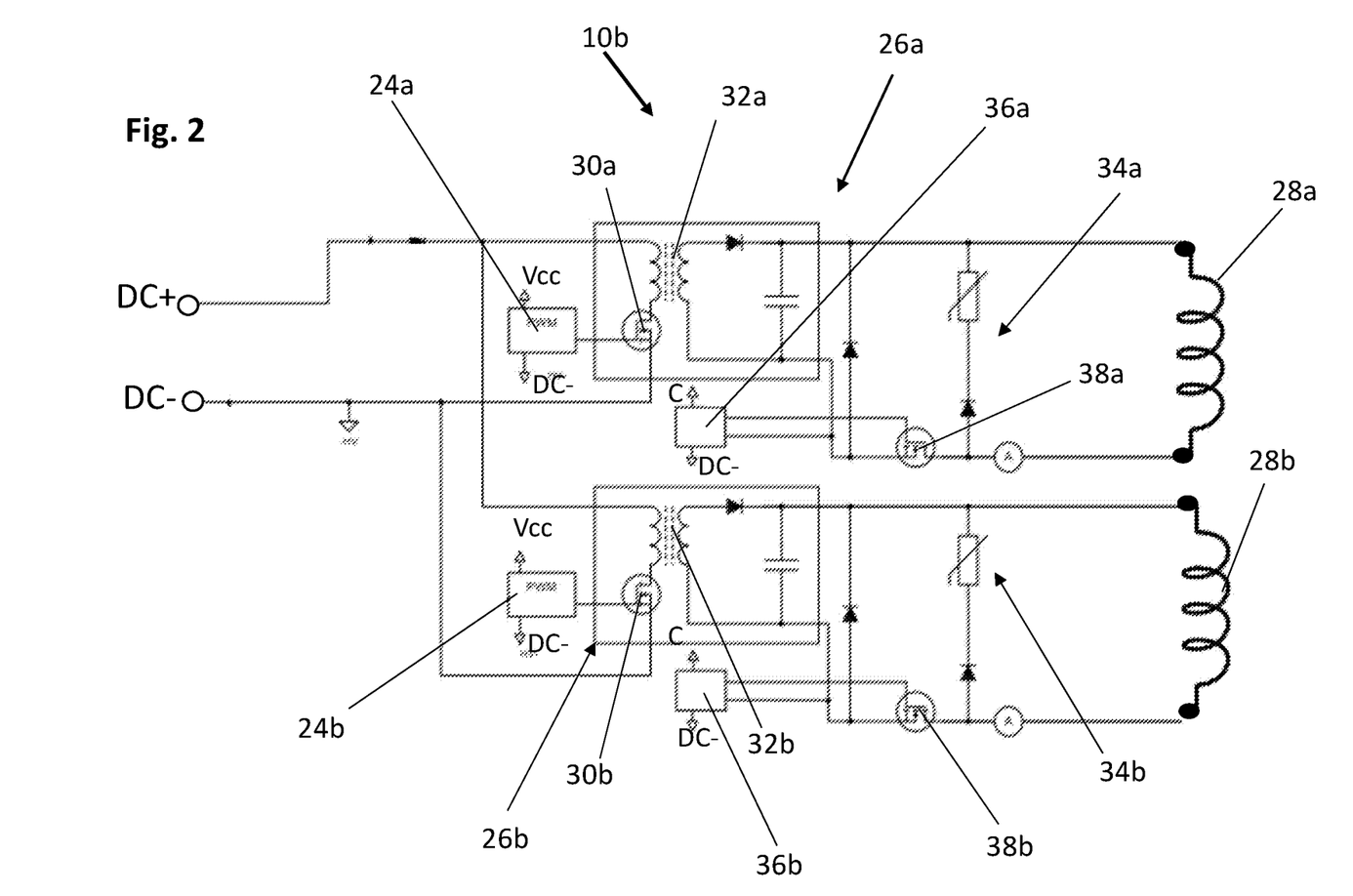
FIG. 2 shows a brake safety circuit of the brake drive with flyback topology driven by the isolated power supply of FIG. 1, FIG. 3 a circuit diagram of the inventive motor drive, FIG. 4 a circuit diagram of an inventive combined motor/brake drive.

FIG. 2 shows a second brake drive part 10*b* with a brake control circuit 26*a,b* co-acting with the first brake drive part 10*a* of FIG. 1 to form of the inventive brake drive 10 for two separate elevator brake coils 28*a*. 28*b*. The brake control circuit 26*a,b* comprises for each elevator brake a brake controller (PWM circuit) 24*a*, 24*b* controlling the corresponding brake control circuit 26*a*, 26*b*. Each of the brake control circuits 26*a*, 26*b* is connected to the corresponding brake coil 28*a*, 28*b* of two parallel elevator brakes. Each brake control circuit 26*a*, 26*b* obtains its input power from the DC link 57 of the drive. Each brake controller 24*a*, 24*b* preferably obtains it supply voltage Vcc from the isolated power supply 15 of FIG. 1, whereas it is preferably referenced to the negative bus bar DC− of the DC link of the frequency converter of the passenger conveyor. Each brake control circuit 26a, 26b comprises a modulating semiconductor switch 30a, 30b which is controlled by the brake controller 24a, 24b. The modulating semiconductor switch 30a, 30b is connected to the primary side of a transformer 32a, 32b of the brake control circuit 26a, 26b. To the secondary side of the transformer 32a, 32b, a second semiconductor switch 38a, 38b of the brake control circuit 26a, 26b is connected to provide an additional means to cut the current to the brake coil 28a, 28b. The second semiconductor switch 38a, 38b obtains its control signal from a gate driver 36a, 36b of the bake control circuit 26a, 26b. The gate driver 36a, 36b obtains its supply power C deviated from the safety signal via the isolated power supply, e.g. via an additional isolated power supply 15 as shown in FIG. 1 or via an additional transformer secondary circuit 20b which is preferably identical to the secondary circuit 20 of the isolated power supply 15 of FIG. 1. In some alternative embodiments, the gate driver 36a, 36b obtains its power supply from DC link of the drive, via an isolated power supply. When the second semiconductor switch 38a, 38b opens, any brake coil current is commutated to a commutation circuit 34a, 34b connected in parallel with the brake coil 28a, 28b to speed up activation of the brake(s).

During normal operation, when the safety switches 13 of the safety controller 14 of the transport conveyor are closed, the first isolated power supply 15 provides a defined output voltage Vcc for the brake controller 24a, 24b. On this behalf, the first isolated power supply 15 comprises in its primary circuit 16 a signal processor 17 which provides a higher frequency control signal, e.g. more than 1 kHz, preferably more than 20 kHz, even up to 500 kHz, to the transformer 18 of the isolated power supply 15. This leads to the generation of a DC supply voltage Vcc for the brake controllers 24a, 24b. As long as the brake controller 24a, 24b obtains the supply voltage Vcc from the first isolated power supply 15, it provides control pulses to the modulating semiconductor switch 30a, 30b which provides a support signal in a frequency range of preferably more than 1 kHz up to 150 kHz, even up to 500 kHz to the transformer 32a, 32b of the brake control circuit 26a, 26b. Also the gate driver 36a, 36b of the second semiconductor switch 38a, 38b obtains from the safety signal, via an isolated power supply 15 its power and thus the brake coil 28a, 28b is energized keeping the brake open. As soon as one of the safety switches 13 opens, the support voltage Vcc of the first isolated power supply 15 drop to zero which stops the brake controller 24a, 24b from working so that the primary side of the transformer 32 in the brake control circuit 26 does not get any supply pulses from the modulating semiconductor switch 30. Thus the brake coil 28 gets no energy which leads to the applying of the elevator brake and to the braking of the elevator. Additionally, the semiconductor switch 38a, 38b opens, so that any current in the brake coil 28a, 28b goes through the commutating circuit 34a, 34b and is wasted there. The inventive brake drive 10 allows a secure braking of the elevator in case of safety-related accidents without the need of mechanical contactors or electromechanical relays between brake controller and AC mains. This ensures a high safety level and avoids/prevents safety related accidents.

Figure 3:
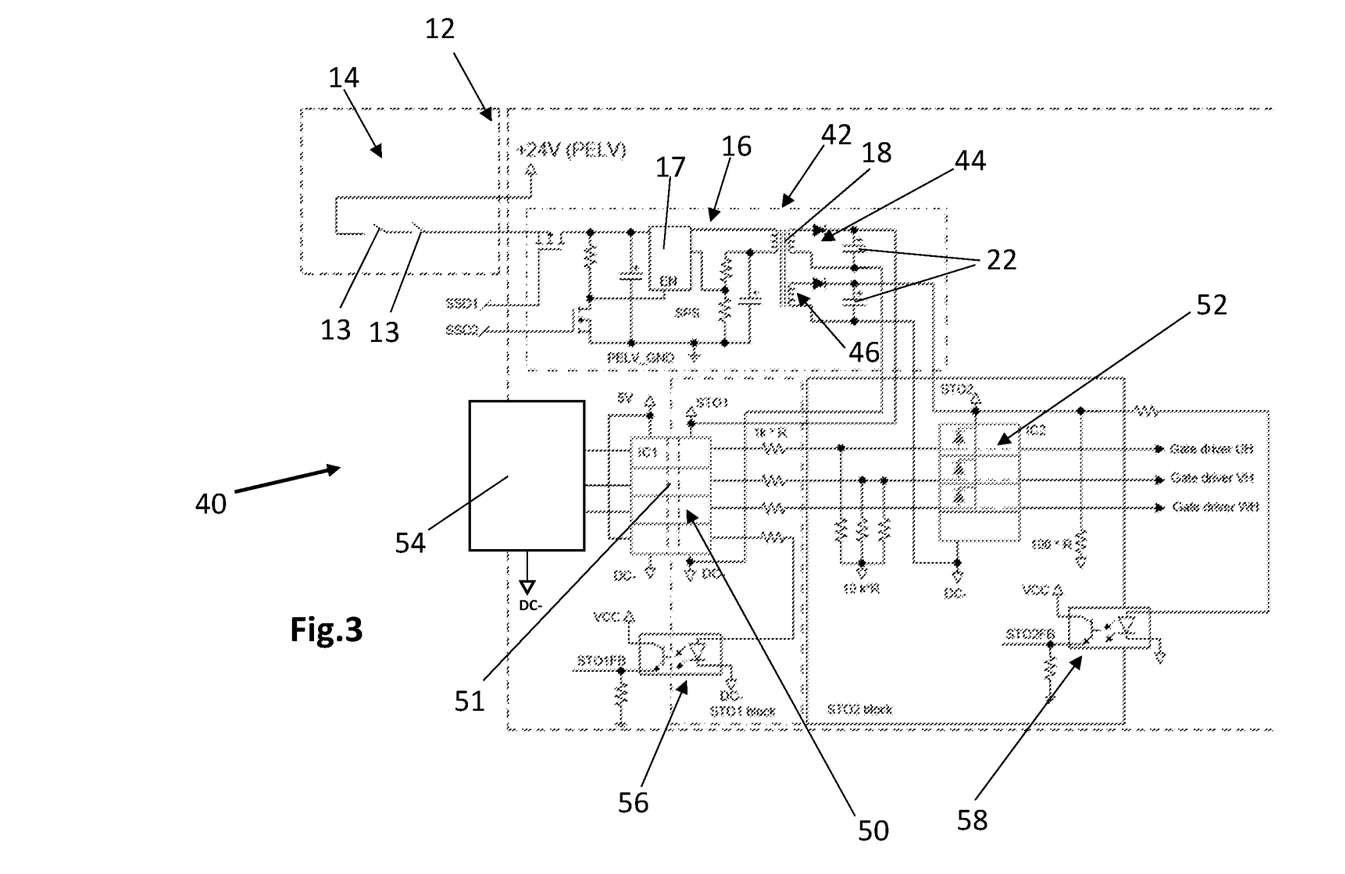

FIG. 3 shows a motor drive 40 of a transport conveyor, preferably of an elevator. The elevator comprises a safety controller 14 with safety switches 13 (safety relays) providing safety signals for a safety interface 12 of the motor drive 40. The safety switches 13 are controlled based on elevator safety status, for example based on status of safety contacts of an elevator safety chain. The safety interface 12 of the motor drive 40 is connected to a second isolated power supply 42 which can also be evaluated as a kind of safety circuit for the motor drive 40. The second isolated power supply 42 comprises a transformer 18 whereby on the primary side of the transformer, a primary circuit 16 with a signal processor 17 is provided to generate a pulsed or AC support voltage for the transformer 18 when the status of the safety signals on the safety interface 12 is on or HIGH. The ON or HIGH safety signal voltage may be preferably a DC voltage of appx. 24-40 V. On the secondary side of the transformer, there are two secondary circuits 44, 46 connected to separate secondary windings of the transformer 18. The secondary circuits 44, 46 are provided with a smoothing capacitor 22 and provide a support voltage for two STO circuits 50, 52 which are connected in series between a motor controller 54 and the gates of power switches of the inverter, indicated by arrows on the right side of the figure. These power switches are normally IGBT or MOSFET semiconductor switches. The first STO circuit 50, which is connected to the motor controller 54, comprises a galvanic isolation 51 to isolate the control signals from the motor controller 54 to provide safety of the first STO circuit 50 against fail signals as short-circuits from the motor controller 54. The output of the first STO circuit 50 is connected to the input of the second STO circuit 52 having its output again connected to the control terminals or power driver of the power switches, preferably of a half bridge of the inverter. The secondary circuits 44, 46 of the isolated power supply 42 provide a supply voltage for the STO circuits 50, 52 (e.g. to the secondary of the first STO circuit and to the second STO circuit) if the signals on the signal interface 12 are ON or HIGH. In case of a safety-related item or accident at least one safety signal on the signal interface 12 goes OFF or LOW, where after the signal processor 17 of the signal processing circuit 16 is shut down so that no voltage is generated in the secondary circuits 44, 46 of the second isolated power supply. Without supply power both STO circuits 50, 52 are shut down so that a redundant cutting of the control signals from the motor controller 54 to the control terminals of the power switches is realized. This provides a very safe operation of the inverter and replaces the use of contactors or electromechanical relays between the frequency converter and AC mains. Thus, preferably, the rectifier in the invention is directly connected to mains without the use of contactors or a relay for cutting the motor power.

Each of the STO circuits 50, 52 comprises a galvanically isolated feedback circuit 56, 58 for feeding back status information about the status of the corresponding STO circuit to the safety controller 14 of the transport conveyor. This status information may again be used to be forwarded to the signal interface to trigger the signal processor 17 of the second isolated power supply 42.

With respect to the embodiment of FIG. 3 it can be mentioned that additionally to the both secondary circuits 44, 46 of the isolated power supply, there may be a third and fourth secondary circuit for both brake controllers of the elevator brake as it is shown in FIGS. 1 and 2. It is further to be mentioned that the FIG. 3 shows the series connection of two STO circuits for one power switch. It is clear that these two STO circuits are to be provided for each of the power switches of at least a half bridge of the inverter, preferably the upper half bridge. The power switches, particularly semiconductor switches of the other half bridge, do not have the STO circuits so as to be able to provide dynamic braking of the elevator car. The brake drive of FIGS. 1 and 2 could also be combined with the motor drive of FIG. 3.

Figure 4:
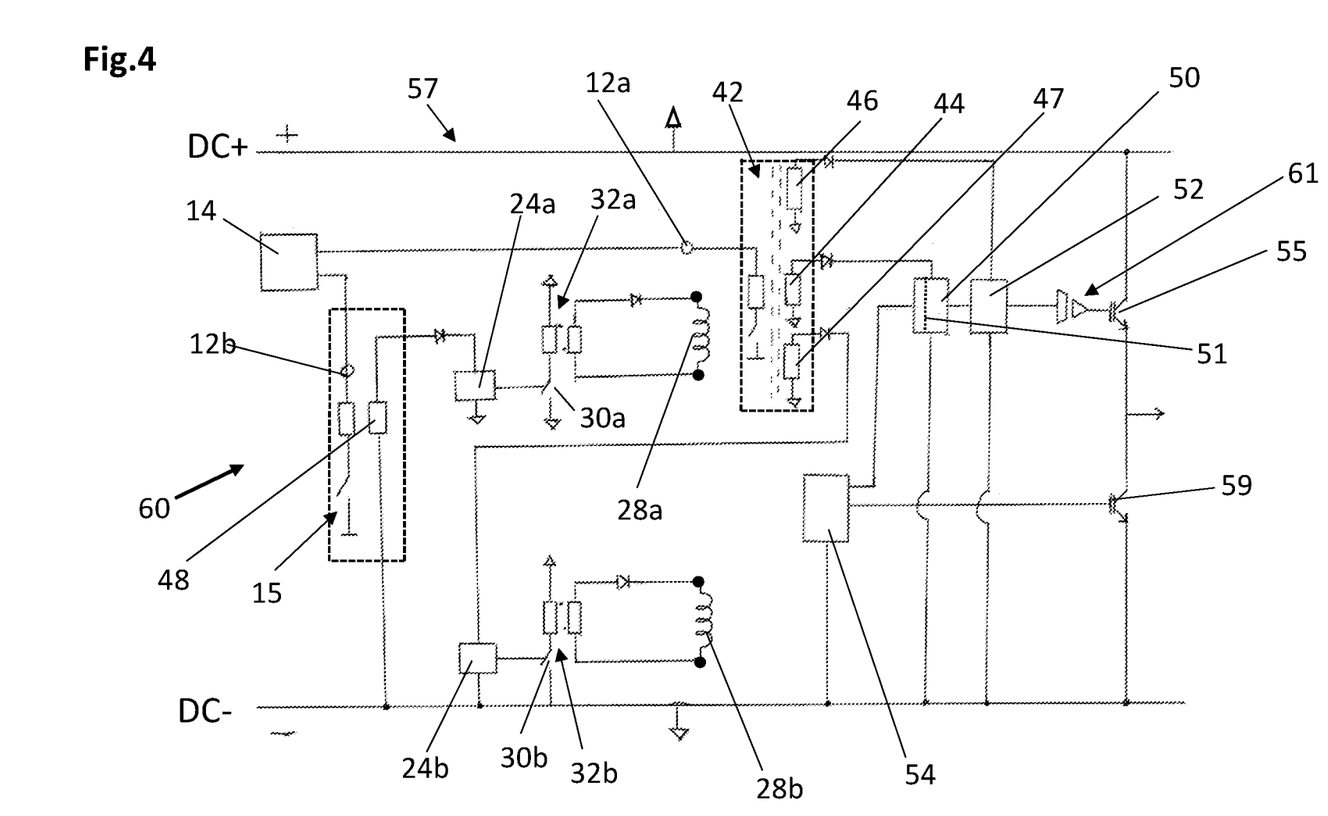

Finally, FIG. 4 shows a transport conveyor drive for the conveyor motor as well as for the conveyor brakes. A first safety interface 12a of the safety controller 14 is here connected with a second isolated power supply 42 driving on its secondary side two STO circuits 50, 52 connected in series between the motor controller 54 and one power switch 55 of the inverter bridge as well as to a second brake controller 24b of the second elevator brake. As it can be seen in the figure, the motor controller 54 is referenced to the minus bus bar of the DC link 57 so that the power switches 59 of the lower half bridge of the inverter can be directly connected to the motor controller 54. In the first STO circuit 50, a galvanic isolation 51 of the input signal of the motor controller 54 is performed so as to protect both safety circuits 50, 52 against signal failures of the motor controller 54 as for example short-circuits.

Further a second safety interface 12b is connected to a brake drive as shown in FIGS. 1 and 2 with a first brake controller 24a for controlling the brake coil 28a of a first elevator brake.

In this embodiment the first safety interface 12a comprises a first safety signal and the second signal interface 12b comprises a second safety signal which has the following advantage. In case of an emergency, first the first safety signal of the first signal interface 12a goes to OFF/LOW which leads to the shutdown of the second isolated power supply 42 and thus via the first and second STO circuits 50, 52 to the shutdown of the power switches 55 of the upper half bridge of the inverter as well as to the braking of the second brake 28b of the elevator. The second safety signal 12b on the second safety interface 12b goes to OFF/LOW with a delay compared to the first safety signal so as to keep the first elevator brake 28 open for the duration of this delay. This allows the stop of the elevator motor and the activation of only one elevator brake to avoid excessive deceleration which could be harmful for the passengers. The other elevator brake 28a can then be activated after the delay when the velocity of the elevator car has decreased sufficiently or has stopped so that with the activation of the further brake no excessive deceleration is obtained.

Alternatively, first the second safety signal of the second signal interface 12b goes to OFF/LOW which leads to the shutdown of the first isolated power supply 15 and thus to the braking of the first brake 28a of the elevator. The first safety signal 12a on the first safety interface 12a goes to OFF/LOW with a delay compared to the second safety signal so as to keep the drive motor operating during brake applying delay of the first brake 28a.

The invention is not delimited to the above embodiments but may be varied within the scope of the appended patent claims. Thus, it is possible to provide between the second STO circuit 52 and the power switch 55 an IGBT driver 61 for boosting the control signal for the IGBT power switch 55.

It is further possible to provide the signals for all STO circuits 50, 52 for the three power switches 55 of the upper half bridge of the inverter via one isolated power supply 42 as well as the control signals for both brake controllers 24a, 24b. Anyway, in this case, the advantage of a reduced brake force at the beginning of an emergency stop is lost.

TABLE OF REFERENCE NUMBERS 10a first brake drive part (isolated power supply)
10b second brake drive part (brake control circuit)
12 signal interface
13 safety switches of the safety controller
14 safety controller of a transport conveyor
15 (first) isolated power supply for the brake controller
16 primary circuit of the isolated power supply
17 signal processor of the primary circuit
18 transformer of the isolated power supply
20 secondary circuit—smoothing circuit
22 capacitor—smoothing capacitor
24a,b (first, second) brake controller
26a,b brake control circuit
28a,b brake coil of the (first, second) conveyor brake
30a,b modulating semiconductor switch
32a,b transformer in the brake control circuit
34a,b commutating circuit
36a,b gate driver
38a,b second semiconductor switch
40 motor drive
42 second isolated power supply
44 first secondary circuit of the second isolated power supply for first STO circuit
46 second secondary circuit of the second isolated power supply for second STO circuit
47 third secondary circuit of the second isolated power supply for second brake controller
48 secondary circuit of first isolated power supply
50 first STO circuit
51 galvanic isolation of the first STO circuit
52 second STO circuit
54 motor controller—DSP
55 power switch of the upper half bridge of the inverter
57 DC link (positive bus bar above, negative bus bar below)
59 power switch of the lower half bridge of the inverter
60 combined motor/brake drive of the transport conveyor/elevator
61 power driver for the power switch of the upper half bridge of the inverter

The invention claimed is:

1. Transport conveyor drive having a rectifier and an inverter which are connected via a DC link, whereby the inverter comprises power switches for suppling electric power to an transport conveyor motor, the transport conveyor drive comprising:
a motor controller for controlling the power switches of the inverter which is configured to produce control pulses in the control poles of the power switches,
at least one safety signal interface, which is adapted to receive safety signals from a safety controller of the transport conveyor,
a brake control circuit having an output for supplying power to a brake coil of an electromagnetic brake, and
at least one STO circuit connected between the motor controller and each of the power switches of at least one half bridge of the inverter, which STO circuit is configured to transfer or cut the control pulses generated by the motor controller to the power switches, the STO circuit being referenced to the first bus bar of the DC link,
wherein
the motor controller is referenced to a first bus bar in the DC link,
a galvanically isolated power supply for the at least one STO circuit is connected between the safety signal interface and the at least one STO circuit, such that an input terminal of the power supply is referenced to ground whereas an output terminal of the galvanically isolated power supply is referenced to the same bus bar of the DC link as the motor controller, whereby the at least one STO circuit is configured to transfer or cut the control pulses to the power switches dependent on the power received from the galvanically isolated power supply, the galvanically isolated power supply being controlled via at least one safety signal received via the safety signal interface, the brake control circuit comprises:
- a transformer with a primary and a secondary side, the transformer primary side being referenced to the first bus bar of the DC link and the secondary side being configured to be connected to a brake coil of an transport conveyor brake,
- a modulating semiconductor switch in the transformer primary side, and
- a brake controller connected to the modulating semiconductor switch and being configured to generate control pulses for said semiconductor switch, the brake controller being referenced to the first bus bar of the DC link, and the galvanically isolated power supply is connected between the safety interface and the brake controller to supply power to the brake controller, whereby an output terminal of the galvanically isolated power supply is referenced to the same bus bar of the DC link as the brake controller.

2. Transport conveyor drive according to claim 1, wherein the first bus bar is a negative DC link bus bar.

3. Transport conveyor drive according to claim 1, wherein the at least one STO circuit comprises a first and a second STO circuit connected in series between the motor controller and the power switch.

4. Transport conveyor drive according to claim 3, wherein the first STO circuit comprises a galvanic isolation of the input signal of the motor controller.

5. Transport conveyor drive according to claim 1, wherein the at least one STO circuit comprises a galvanically isolated feedback circuit, configured to signalize the status of the at least one STO circuit to a safety controller of the transport conveyor.

6. Transport conveyor drive according to claim 1, wherein the modulating semiconductor switch is a SiC MOSFET transistor.

7. Transport conveyor drive according to claim 1, wherein the galvanically isolated power supply comprises a transformer with a primary side connected to a primary signal processing circuit and a secondary side connected to the at least one STO circuit or the brake controller.

8. Transport conveyor drive according to claim 7, wherein the galvanically isolated power supply comprises a separate secondary side for each STO circuit and for each brake controller.

9. Transport conveyor drive according to claim 1, wherein the brake control circuit has an isolated flyback topology.

10. Transport conveyor drive according to claim 1, wherein the brake control circuit comprises two channels for supplying power to two electromagnetic brakes.

11. Transport conveyor drive according to claim 3, wherein the first and second STO circuits are connected between the motor controller and the power switches of the upper half bridge of the inverter.

12. Transport conveyor drive according to claim 1, wherein a first isolated power supply is connected to one brake controller and a second isolated power supply is connected to another brake controller and to the at least one STO circuits.

13. Transport conveyor having at least one transport conveyor and transport conveyor drive according to claim 1.

14. Transport conveyor according to claim 13, being an elevator with at least one elevator car or an escalator/moving sidewalk.

15. Transport conveyor according to claim 13, having a safety controller with a multitude of safety switches, wherein the outputs of the safety controller being connected to the at least one safety interface.

16. Transport conveyor according to claim 15, having a safety controller with an input for the output signals of feedback circuits of first and second STO circuits for the monitoring of the inverter and/or STO circuit status.

17. Transport conveyor drive according to claim 2, wherein the STO circuit comprises a first and a second STO circuit connected in series between the motor controller and the power switch.

18. Transport conveyor drive according to claim 2, wherein the at least one STO circuit comprises a galvanically isolated feedback circuit, configured to signalize the status of the STO circuit to a safety controller of the transport conveyor.

19. Transport conveyor drive according to claim 3, wherein the at least one STO circuit comprises a galvanically isolated feedback circuit, configured to signalize the status of the STO circuit to a safety controller of the transport conveyor.

20. Transport conveyor drive according to claim 4, wherein the at least one STO circuit comprises a galvanically isolated feedback circuit, configured to signalize the status of the STO circuit to a safety controller of the transport conveyor.

* * * * *